(12) United States Patent
Schmitz

(10) Patent No.: US 8,720,939 B2
(45) Date of Patent: May 13, 2014

(54) INTERIOR TRIM PART

(75) Inventor: Stefan Schmitz, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/592,463

(22) Filed: Aug. 23, 2012

(65) Prior Publication Data

US 2013/0062867 A1   Mar. 14, 2013

(30) Foreign Application Priority Data

Sep. 9, 2011   (DE) .......................... 10 2011 053 435

(51) Int. Cl.
*B60R 21/21* (2011.01)
*B60Q 3/00* (2006.01)
*B60Q 3/02* (2006.01)

(52) U.S. Cl.
CPC .............. *B60Q 3/0216* (2013.01); *B60R 21/21* (2013.01)
USPC ...................... 280/728.3; 296/146.7; 362/488; 362/501

(58) Field of Classification Search
USPC .................. 280/728.3; 296/1.08, 1.09, 146.7; 296/146.9; 362/488, 489, 501, 509, 511, 362/512
See application file for complete search history.

(56) References Cited

U.S. PATENT DOCUMENTS

| 5,136,276 A * | 8/1992 | Wayne ........................... 340/461 |
| 6,848,706 B2 * | 2/2005 | Kreuzer et al. ............ 280/728.3 |
| 8,079,742 B2 | 12/2011 | Iwai et al. |
| 2006/0221626 A1 * | 10/2006 | Kamiya et al. ................. 362/514 |
| 2010/0176579 A1 * | 7/2010 | Gulde ........................... 280/731 |
| 2012/0074674 A1 * | 3/2012 | Ohoka et al. ............... 280/728.3 |

FOREIGN PATENT DOCUMENTS

| DE | 10020098 | 10/2001 |
| DE | 10338818 | 9/2004 |
| DE | 102009056214 | 6/2011 |
| EP | 1973767 B1 * | 2/2011 |
| JP | 2002254983 | 9/2002 |
| WO | 2007084031 | 7/2007 |

OTHER PUBLICATIONS

Utsuno et al., Vehicular Interior Trim Member, Sep. 11, 2002, JPO, JP 2002-54983 A, Machine Translation of Description.*

* cited by examiner

*Primary Examiner* — James English
(74) *Attorney, Agent, or Firm* — Gerald E. Hespos; Michael J. Porco; Matthew T. Hespos

(57) ABSTRACT

An interior trim part for a bodywork component has a lighting system with a first component that generates a light signal and a second component that outputs the light signal toward the passenger compartment of the motor vehicle. The bodywork component has a moveable region (200) that can be moved with respect to a non-moveable region (300), from a stationary normal position into an open position displaced with respect to the non-moveable region (300). The first component of the light system generates, in the normal position of the moveable region (200), a light signal that is input into the second component which passes on the light signal in the manner of a lightguide.

14 Claims, 5 Drawing Sheets

INTERIOR TRIM PART

CROSS REFERENCE TO RELATED APPLICATION

This application claims priority under 35 USC 119 to German Patent Appl. No. 10 2011 053 435.0 filed on Sep. 9, 2011, the entire disclosure of which is incorporated herein by reference.

BACKGROUND OF THE INVENTION

1. Field of the Invention

The invention relates to an interior trim part for a bodywork component of a motor vehicle.

2. Description of the Related Art

Lights, such as light-emitting diodes, have been accommodated in trim parts of a motor vehicle to define parts of a passenger compartment lighting system or to generate signals that indicate a specific vehicle state (for example vehicle is open or locked). In this context, a lightbulb or diode partially penetrates a corresponding opening in the trim part and outputs corresponding light signals in the direction of the passenger compartment of the vehicle. Of course, such lights are supplied with power. Some trim parts are moveable, such as flaps or lids, require a cable length to be made available. Trim parts that cover an airbag are pivoted when the airbag unfolds and it may be necessary to lay cables separately to avoid impeding the unfolding of the airbag. This can entail additional costs.

The object of the invention is to integrate a lighting system into an interior trim part in a cost-effective manner.

SUMMARY OF THE INVENTION

The invention relates to a lighting system for an interior trim part formed from first and second components. The first component is attached to the nonmoveable region of the interior trim part, while the component of the lighting system is arranged on the moveable region of the interior trim part. The two components of the lighting system interact with one another so that the first component generates a light signal that is input into the second component. A cable connection is not required for this connection between the first and second components. As a result, the first component can be provided in a noncritical part of the nonmoveable region, while the second component on the moveable region functions as a lightguide. Thus, the second component of the lighting system disposed on a trim part of a pivotable flap, a lid or other moveable region will not affect an airbag or other apparatus behind the moveable region.

The first component, which generates the light signal, preferably is attached in a positively locking fashion to the nonmoveable region. Thus, the first component can be secured easily and cost-effectively.

The second component preferably is a lightguide that is held in a sleeve. In the stationary normal position of the nonmoveable region, the end of the lightguide that is directed toward the first component can extend to close to the first component here.

The sleeve with which the lightguide is held then preferably is attached to the moveable region.

In the case of an interior trim part that covers an airbag, the moveable region can be connected hingedly to the non-moveable region. The airbag unfolds passes through corresponding predetermined breaking points as the airbag unfolds and the moveable region then is pivoted about the hinge.

Further advantageous requirements are explained in more detail in the text which follows with reference to the drawings.

DETAILED DESCRIPTION OF THE PREFERRED EMBODIMENTS

Figure 1:
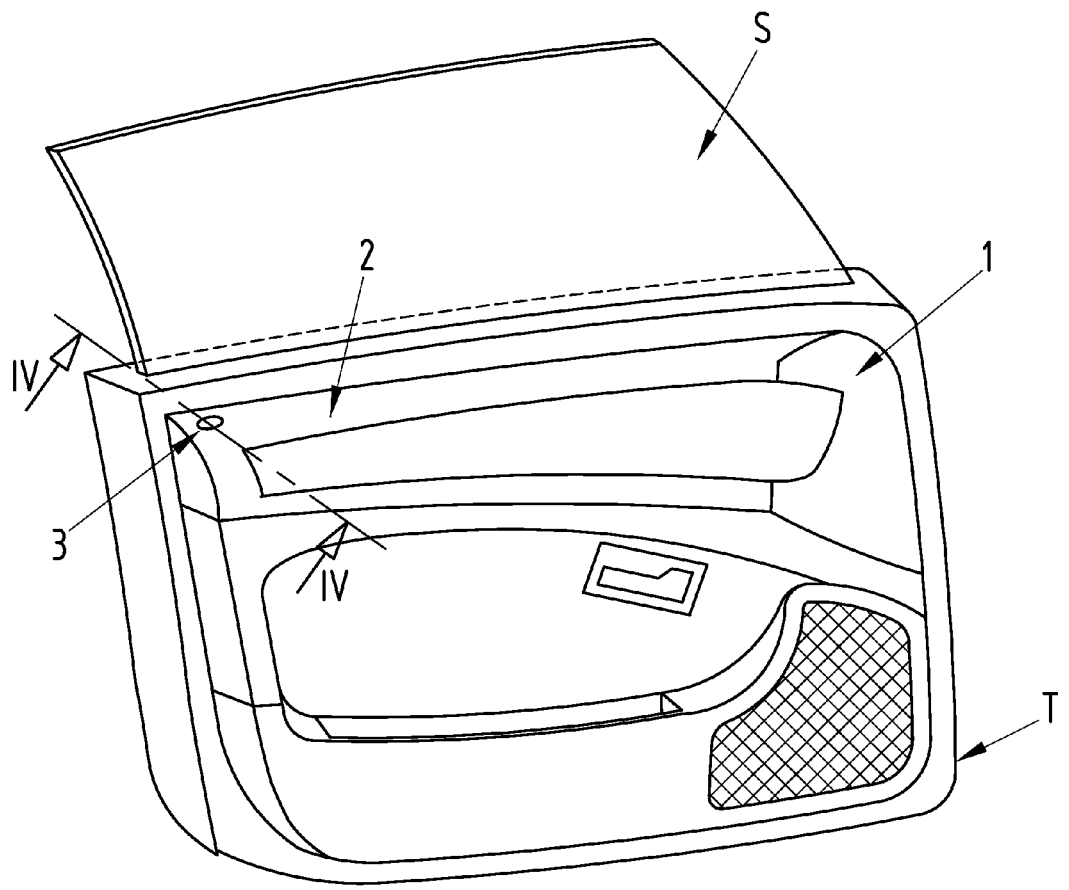
FIG. 1 shows a motor vehicle door having an interior trim part in a view from the inside.
Figure 2:
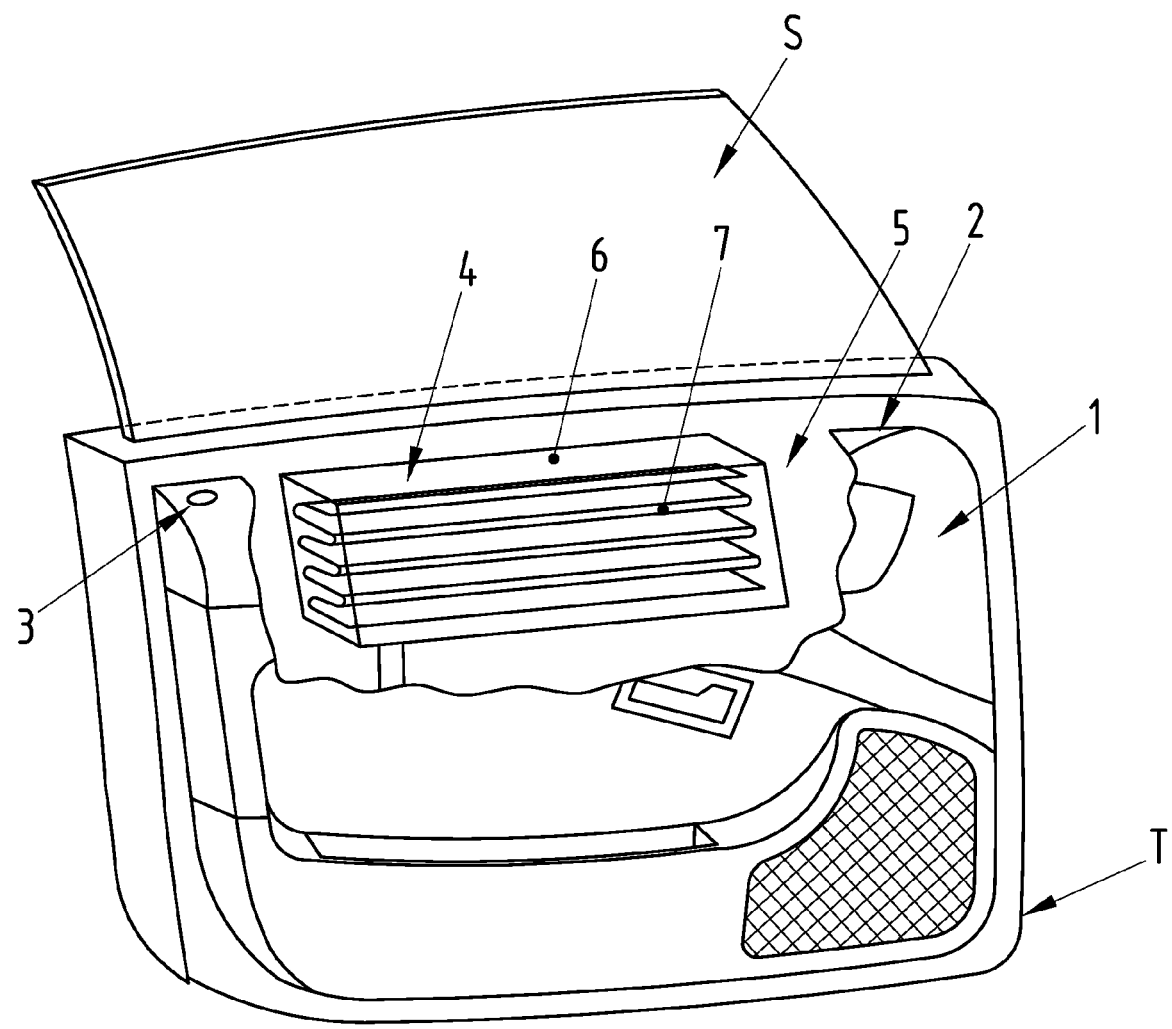
FIG. 2 shows the vehicle door of FIG. 1 having a partially sectional interior trim part.
Figure 3:
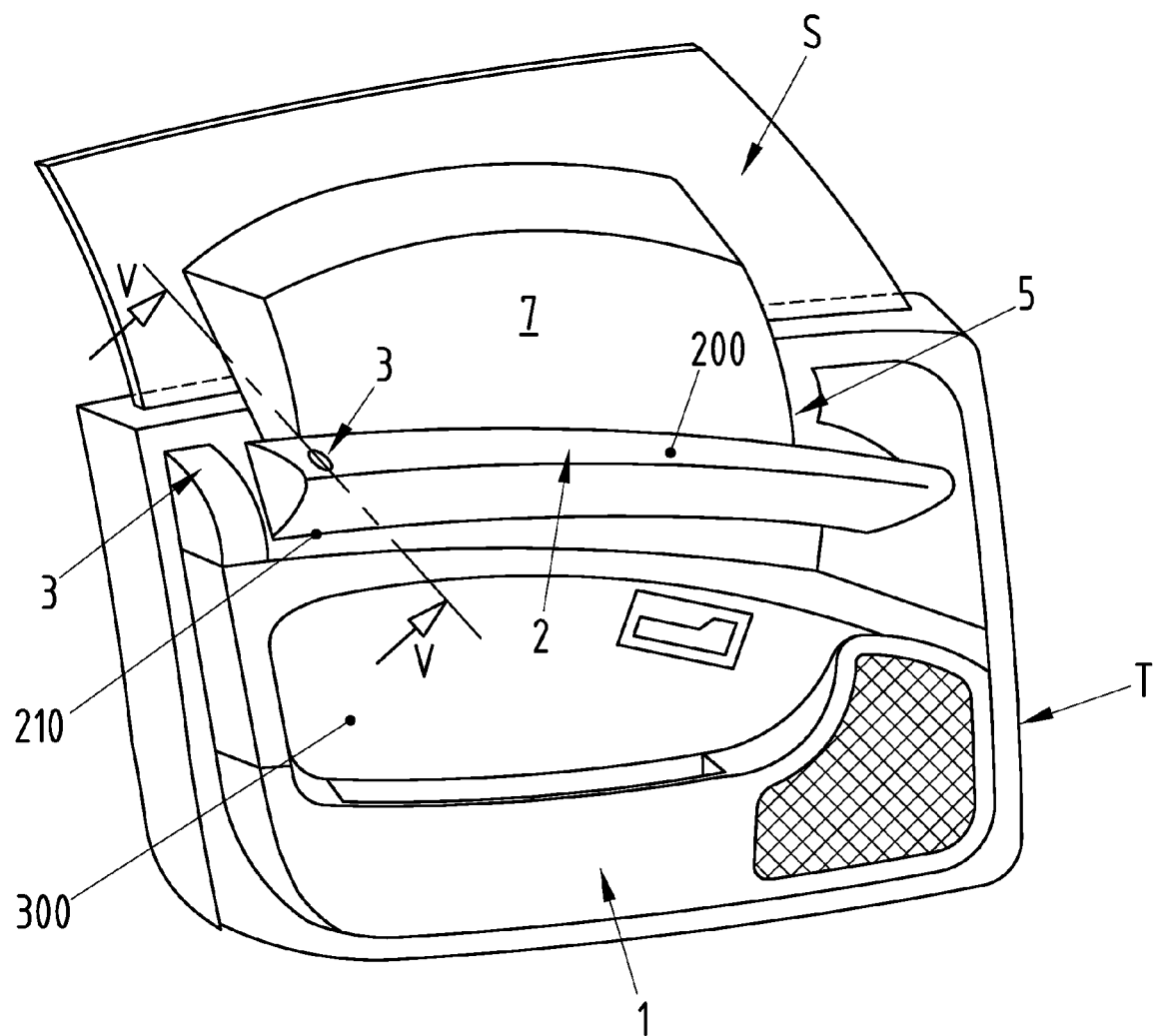
FIG. 3 shows the vehicle door of FIG. 1 with an unfolded airbag.

FIGS. 1 to 3 illustrate a door trim 1 for a motor vehicle door T. The door T includes a door sill 2 that points toward a side window S and a signaling light 3 is accommodated in the door sill 2 to provide information about the closed state of the door by means of a corresponding light signal in a way that can be perceived optically even outside the vehicle. A vehicle occupant protection system 4 is attached to a bodywork component 5 located under the door sill 2 and includes an airbag 7 that can unfold. More particularly, the airbag 7 of the vehicle occupant protection system 4 is folded in a casing 6 and suddenly is filled with gas in the case of a side impact. The increase in pressure and volume within the airbag 7 causes the airbag 7 to exit its casing 6 and fill the space between the door structure 5 and the door sill 2 of the door trim 1 until the airbag 7 presses open the door sill 2 in the manner of a hinge. The airbag 7 then penetrates the passenger compartment of the vehicle as an air cushion to protect the vehicle occupant. A region 200 of the door trim 1 that moves in a side impact is pivoted about a hinge 210 in the door trim 1, with respect to a nonmoveable region 300 of the door trim 1. The hinge 210 generally is not visible from the visible side of the door trim 1. The same applies to the predetermined breaking points (not illustrated), through which the airbag passes.

FIGS. 4 to 7 show the lighting system that ensures the airbag 7 can unfold. The first component of the lighting system is a lighting means 12 attached in a positively locking fashion, for example, by latching hooks 11, and is positioned in a fixed fashion independently of the movement of the moveable region 200 of the door trim 1. The second component of the lighting system is a sleeve 9 that is a receptacle for a lightguide 10. The sleeve 9 is attached to the sill 2 to the moveable region 200 of the door trim 1. As a result, the unfolding airbag 7 moves both the sleeve 9 and the lightguide 10 during the hinge-like opening of the moveable region 200. The light signal of the lighting means 12 is represented by beam lines in FIGS. 4 and 5 and is input into a plate-like flange 13 of the lightguide 10 via the gap between the lightguide 10 and the lighting means 12 in the case of an intact sill 2, i.e. in the stationary normal position. The light beams propagate within the lightguide 10 to the end 14 of the lightguide 10 that points to the passenger compartment of the vehicle.

The sill 2 or moveable part 200 is opened in a hinge-like manner due to the gas charge of the airbag 7. The sleeve 9 and the lightguide 10 follow the acceleration movement of the sill 2, while the lighting means 12 remains positioned fixedly on the nonmoveable region. The sleeve 9 and the lighting means 12 are not connected fixedly and hence can move with respect to one another. The space between the door sill 1 and the bodywork component 5 suddenly fills in the course of the charging the airbag 7 with gas. The absence of power supplies leading to the lightguide 10 ensures a precise opening of the sill 2 and rapid formation of a gas cushion of the airbag 7.

The sleeve 9 and the lightguide 10 remain attached during the opening of the sill 2. Thus, the lightguide 10 transmits light signals in the case of an intact sill 2 and also secures the sleeve 9 in the manner of a dowel pin under the influence of the acceleration when the sill 2 is opened.

The lightguide 10 is a rotationally symmetrical body with a projection 15 that is rectangular or trapezoidal in cross section adjacent to the flange 13 on the lightguide sheath and a groove-like depression 16 is arranged adjacent to the projection 15. The lightguide 10 also has a chamfer-like taper 17 between the end 14 that points toward the passenger compartment of the vehicle and the groove-like depression 16.

The sleeve 9 has a cylindrical tubular body that extends along the longitudinal axis and a plate-like flange 18 is at the end of the sleeve 9 that extends toward the passenger compartment of the vehicle. The underside of the flange 18 rests on a resilient or compressible surface of a decorative element 19 of the sill 2. The end of the sleeve 9 facing away from the flange 18 has latching hooks 20 that rebound perpendicularly with respect to the longitudinal axis of the sleeve 9. The latching hooks 20 have latching faces 21 that extend parallel to the underside of the flange 18 and that engage the groove-like depression 16 in the pre-assembly position of FIG. 5.

The hooks 22 of the sleeve 9 underneath the plate-like flange 18 also rebound perpendicularly with respect to the longitudinal axis of the sleeve and are equipped on the head side with a convexly curved surface 23. The distance between the apex point of the convexly curved surface 23 of the hook 22 and the underside of sleeve flange 18 is slightly smaller than the material thickness of the sill 2 including the surface decorative element 19 applied there. According to FIG. 6, the sleeve 9 and lightguide 10 are connected captively to one another in the pre-assembly position. This pre-assembled sleeve-lightguide unit can be plugged into the associated opening in the sill 2 with one manual operation. In the pre-assembly position, the hooks 22 are inclined into the sleeve interior to such an extent that their tips 24 lie within the external diameter of the sleeve tubular body, and as a result the sleeve 9 therefore is not yet secured in the sill of the door trim 1.

Figure 4:
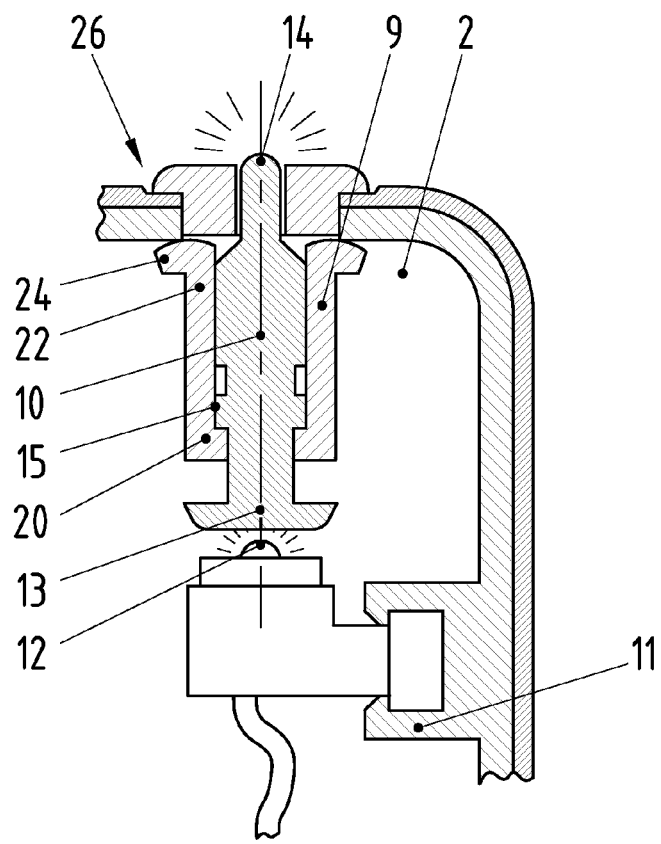
FIG. 4 shows a section along the line IV-IV in FIG. 1.
Figure 5:
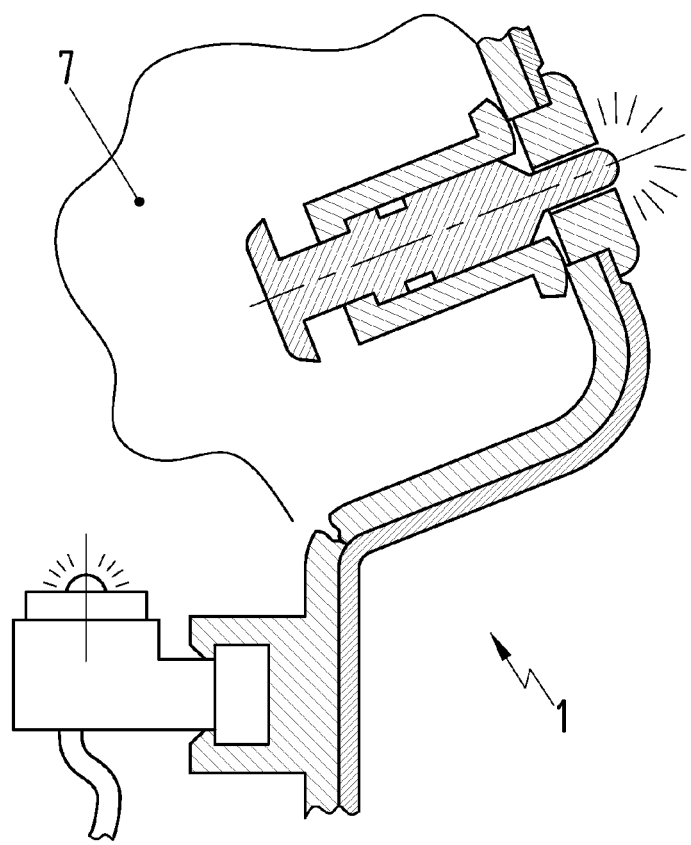
FIG. 5 shows a section along the line V-V in FIG. 3.
Figure 6:
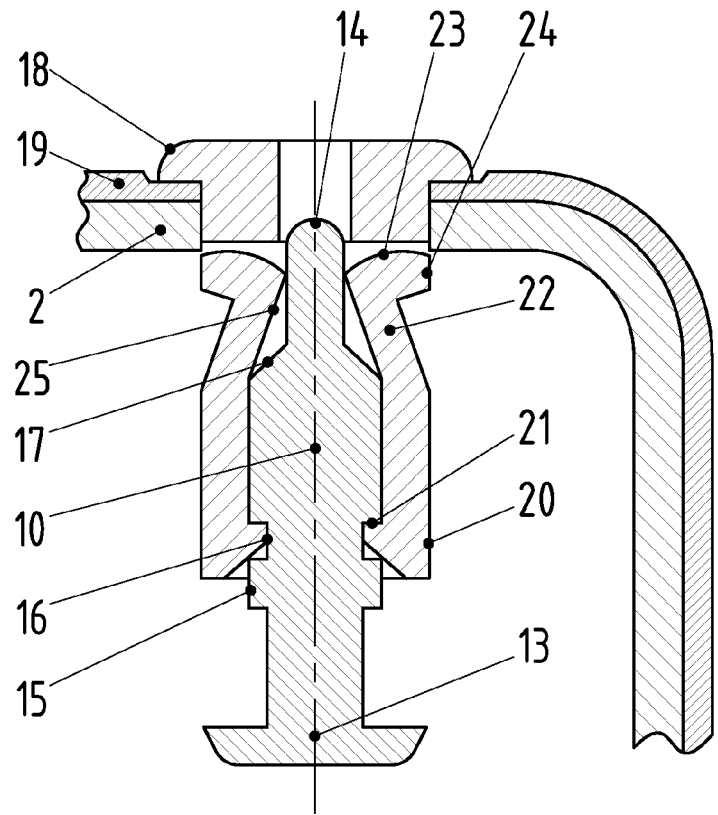
FIG. 6 is sectional illustration according to FIG. 4 in a pre-assembly position of a component of the lighting system.
Figure 7:
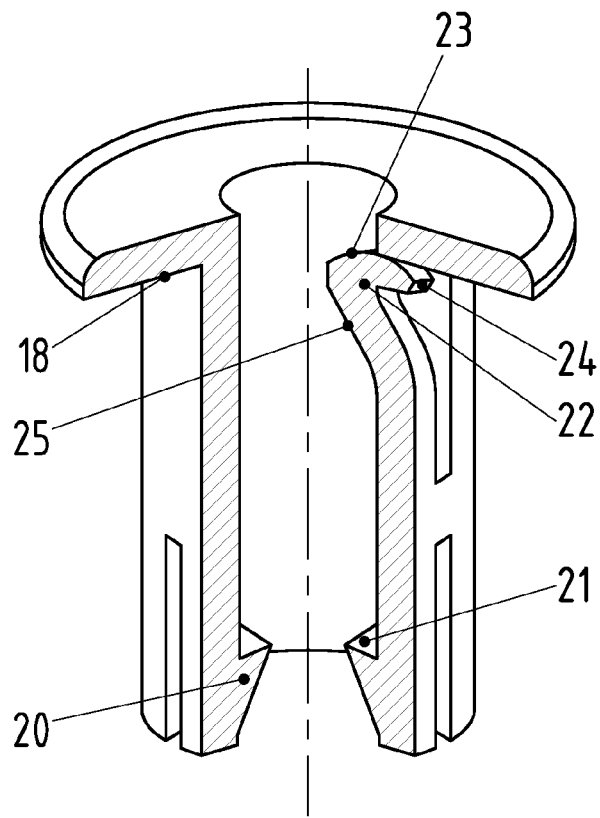
FIG. 7 illustrates the sleeve of FIG. 6.

This securing of the sleeve 9 in the sill 2 is brought about by pressing the lightguide 10 at the flange 13 longitudinally into the sleeve and therefore into a securing end position. This positionally secured state can be seen in FIG. 4. The chamfer-like taper 17 of the lightguide 10 is mounted on the back 25 of the hook when the lightguide is pressed in, and the hooks 22 are spread apart outward due to the wedge effect of this geometric configuration. During this spreading apart, the hook tips 24 move under the sill 2 until the underside of the sill 2 is in engagement with the apex point of the convexly curved head face 23 of the spread-apart hooks 22. In this context, the flange 18 of the sleeve 9 is pulled into the elastically resilient surface decorative element 19 to produce a cleanly embedded joint structure 26 on the visible side of the sill 2 along the contour of the sleeve flange 18. Additionally, the flange 18 of the sleeve 9 presses the surface decorative element 19 to ensure a force component in the longitudinal direction of the sleeve that has an additionally clamping effect between the sleeve flange 18 and the convexly curved hook head 23 to achieve a securing effect for the sleeve 9. These effects are possible because the distance between the apex point of the convexly curved surface 23 of the hook 22 and the underside of the sleeve flange 18 is slightly smaller than the material thickness of the sill 2 including the initially unpressed surface of the decorative element 19. The end position of the lightguide, which secures in the manner of a spreading apart dowel pin, is reached when the latching hooks 20 of the sleeve 9 rebound perpendicularly with respect to the longitudinal axis of the hooks so that the latching faces 21 of the latching hooks 20 engage the surface of the projection 15 on the lightguide 10 that faces the flange 13, as shown in FIG. 4. This positive engagement, together with the frictional engagement between the chamfer-like taper 17 of the lightguide 10 and the spread-apart back 25 of the hook of the sleeve 9, ensures that the lightguide 10 is secured in the sleeve 9 in the finally assembled state. This securing is maintained even during acceleration at the hinge-like opening of the sill 2, with the result that the lightguide 10 is secured in the sleeve 9, and the sleeve 9 is secured in the sill 2 under all vehicle protection conditions and vehicle occupant protection conditions.

The embodiment of the light system described above can also be used for flaps or lids. In this context, the sleeve 9 can be positioned with the lightguide 10 on the flap, that is to say the moveable region. It is then conceivable for the light signal to be generated as a function of the state of the flap.

What is claimed is:

1. An interior trim part for a bodywork component of a motor vehicle having a non-moveable region and a moveable region that can be moved with respect to the non-moveable region from a stationary normal position into an open position displaced with respect to the non-moveable region and a lighting system comprising at least a first component that is mounted to the non-movable region and generates a light signal and a second component that is mounted to the movable region, the second component including a sleeve having an end mounted through an opening in the movable region, a flange at the end of the sleeve and mounted on an outer surface of the movable region, hooks formed on the sleeve and projecting toward the flange and a lightguide mounted in the sleeve and urging the hooks into engagement with an inner surface of the movable region, the lightguide being disposed to receive the light signal from the first component and to output the light signal toward a passenger compartment of the motor vehicle when the moveable region is in the stationary normal position.

2. The interior trim part of claim 1, wherein the moveable region is connected hingedly to the non-moveable region.

3. The interior trim part of claim 1, wherein the open position of the moveable region is brought about by unfolding an airbag arranged between the interior trim part and the bodywork component.

4. The interior trim part of claim 1, wherein the hooks are cantilevered on the sleeve to project toward the flange.

5. The interior trim part of claim 4, wherein areas of the sleeve adjacent the flange have an outer cross-section substantially conforming to an inner cross-section of the opening in the movable region.

6. The interior trim part of claim 5, wherein the hooks substantially conform to the outer cross-section of the sleeve prior to full mounting of the lightguide into the sleeve, and wherein the lightguide urges the hooks to project out from the sleeve and into engagement with the inner surface of the movable region when the lightguide is mounted fully in the sleeve.

7. The interior trim part of claim 6, wherein the hooks have tips that face the flange when the lightguide is mounted fully in the sleeve, a distance between the flange and the tips of the hooks being less than a thickness of the movable region adjacent the opening therein so that the hooks and the flange are clamped to the movable region.

8. The interior trim part of claim 1, wherein the flange is at a first end of the sleeve, the sleeve further having a second end opposite the first end, latching hooks projecting inward on the sleeve adjacent the second end, the latching hooks being positively engaged in a groove of the lightguide when the lightguide is mounted fully in the sleeve.

9. A motor vehicle having an airbag that can be expanded from a folded condition to an expanded condition in response to crash, an interior trim part having a non-moveable region and a moveable region covering the airbag, the moveable region being moveable with respect to the non-moveable region in response to expansion of the airbag, a lighting system comprising a first component that generates a light signal and a second component mounted to the moveable region, the second component including a sleeve having an end mounted through an opening in the movable region, a flange at the end of the sleeve and mounted on an outer surface of the movable region, hooks formed on the sleeve and projecting toward the flange and a lightguide mounted in the sleeve and urging the hooks into engagement with an inner surface of the movable region, the lightguide being disposed to receive light from the first component and to direct the light toward a passenger compartment of the motor vehicle when the airbag is in the folded condition.

10. The motor vehicle of claim 9, wherein the hooks are cantilevered on the sleeve to project toward the flange.

11. The motor vehicle of claim 10, wherein areas of the sleeve adjacent the flange have an outer cross-section substantially conforming to an inner cross-section of the opening in the movable region.

12. The motor vehicle of claim 11, wherein the hooks substantially conform to the outer cross-section of the sleeve prior to full mounting of the lightguide into the sleeve, and wherein the lightguide urges the hooks to project out from the sleeve and into engagement with the inner surface of the movable region when the lightguide is mounted fully in the sleeve.

13. The motor vehicle of claim 12, wherein the hooks have tips that face the flange when the lightguide is mounted fully in the sleeve, a distance between the flange and the tips of the hooks being less than a thickness of the movable region adjacent the opening therein so that the hooks and the flange are clamped to the movable region.

14. The motor vehicle of claim 9, wherein the flange is at a first end of the sleeve, the sleeve further having a second end opposite the first end, latching hooks projecting inward on the sleeve adjacent the second end, the latching hooks being positively engaged in a groove of the lightguide when the lightguide is mounted fully in the sleeve.

* * * * *